(12) United States Patent
Janssen

(10) Patent No.: US 7,405,676 B2
(45) Date of Patent: Jul. 29, 2008

(54) METHOD AND SYSTEM FOR DETECTING WITH LASER THE PASSAGE BY A VEHICLE OF A POINT FOR MONITORING ON A ROAD

(75) Inventor: Theodorus Maria Janssen, Spaarndam (NL)

(73) Assignee: Gatsometer B.V., Haarlem (NL)

( * ) Notice: Subject to any disclaimer, the term of this patent is extended or adjusted under 35 U.S.C. 154(b) by 47 days.

(21) Appl. No.: 11/061,367

(22) Filed: Feb. 18, 2005

(65) Prior Publication Data

US 2006/0055560 A1    Mar. 16, 2006

(30) Foreign Application Priority Data

Sep. 10, 2004    (NL) .................................... 1027020

(51) Int. Cl.
*G08B 1/04* (2006.01)

(52) U.S. Cl. ........................ 340/942; 340/556; 340/557; 250/224

(58) Field of Classification Search ................. 340/942, 340/555–557, 555–7; 250/200, 222.1, 224
See application file for complete search history.

(56) References Cited

U.S. PATENT DOCUMENTS

| | | | |
|---|---|---|---|
| 5,793,491 A | 8/1998 | Wangler et al. | |
| 5,896,190 A | 4/1999 | Wangler et al. | |
| 6,160,949 A * | 12/2000 | Iizuka | 386/28 |
| 6,965,438 B2 * | 11/2005 | Lee et al. | 356/625 |
| 7,107,144 B2 * | 9/2006 | Capozzi et al. | 701/117 |
| 7,190,306 B2 | 3/2007 | Janssen | |
| 2004/0008514 A1 | 1/2004 | Lee et al. | |

FOREIGN PATENT DOCUMENTS

| | | |
|---|---|---|
| EP | 0674186 A | 9/1995 |
| JP | 11203588 | 7/1999 |
| WO | WO 98/16801 | 4/1998 |
| WO | WO98/16801 * | 4/1998 |

\* cited by examiner

*Primary Examiner*—Davetta W. Goins
*Assistant Examiner*—Hongmin Fan
(74) *Attorney, Agent, or Firm*—Morgan, Lewis & Bockius LLP; Richard F. Trecartin; Victor E. Johnson

(57) ABSTRACT

The invention relates to a method for detecting the passage by a vehicle of a determined point for monitoring on a road, wherein from a remotely situated location a laser beam is transmitted continuously to the point for monitoring, reflections from the transmitted laser beam are received at the remotely situated location, and it is determined from the received reflections that the vehicle is passing the point for monitoring. The laser beam can be transmitted at right angles to the travel direction of the passing vehicle. The detection can be used to activate a red-light camera, to measure the speed of the vehicle or measure the traffic intensity, without sensors, for instance induction loops, having to be arranged in the road for this purpose. The invention further relates to a system for performing this method.

18 Claims, 3 Drawing Sheets

METHOD AND SYSTEM FOR DETECTING WITH LASER THE PASSAGE BY A VEHICLE OF A POINT FOR MONITORING ON A ROAD

CROSS REFERENCE TO RELATED APPLICATIONS

This application claims priority to Dutch Application Number 1027020, filed Sep. 10, 2004.

TECHNICAL FIELD

The invention relates to a method for detecting the passage by a vehicle of a determined point for monitoring on a road. Such a method is generally known, and is used for instance in establishing traffic violations such as driving through a red light, or in measurements of traffic density, for instance for the purpose of guiding traffic in order to enhance traffic flow.

BACKGROUND OF THE INVENTION

In most known methods use is made of sensors which are mounted in or on the road surface. A classic example are air-filled conduits laid over the road surface which record a pressure difference when the wheels of a vehicle drive over them. Loads on the road surface by passing vehicles can also be detected using piezoelectric elements embedded in the road surface. Most widely used however are inductive detections. Here the change is measured in the amperage in a loop-like conductor in the road surface which results from the change in the electromagnetic field when a vehicle—largely consisting of metal—passes by.

The drawback which all said methods have in common is that they require modifications to the road surface at the location to be monitored, for instance a stop line at a traffic light. Cutting operations are generally required for this purpose, whereby the road must be closed for a time. This is increasingly less acceptable as the amount of traffic increases, all the more so because it is usually precisely at the busiest points in the road network that the detectors are required. Furthermore, the number of sensors which can be accommodated at a given location in the road surface is limited, since there must be sufficient space between them so that they do not affect each other's operation. It is mainly at busy intersections that large numbers of sensors, particularly induction loops, are often found in the road surface. In addition to loops which must detect driving through a red light, there are often also loops which respond to the presence of a vehicle at a intersection which is otherwise empty in order to set the traffic light to green, and loops which respond to the presence of vehicles which have priority, such as buses, emergency service vehicles and the like.

SUMMARY OF THE INVENTION

The invention therefore has for its object to provide a method of the above described type wherein this drawback does not occur. According to the invention this is achieved in such a method in that from a remotely situated location at least one laser beam is transmitted substantially continuously to the point for monitoring, reflections from the at least one transmitted laser beam are received at the remotely situated location, and it is determined from the received reflections that the vehicle is passing the point for monitoring. By making use for the detection of laser beams which can be transmitted and received at a location which can be situated quite a distance from the point for monitoring, it is possible to dispense with the arranging of sensors on or in the road surface.

The at least one laser beam is preferably transmitted at right angles to the travel direction of the passing vehicle, so that from the transmitting and receiving location, which can be chosen at a distance from and in line with the point for monitoring, the moment of passing can be determined exactly.

Passing of the point for monitoring can be determined in reliable manner by transmitting at least two parallel laser beams and comparing the received reflections from the various laser beams.

In order to prevent incorrect detections as a result of for instance noise or birds passing through the laser beam, a profile of the vehicle is preferably determined each time from a number of successively received reflections of a laser beam, and a detection of the vehicle passing the point for monitoring is only valid if the profiles determined from reflections of the various laser beams correspond precisely. In this way also non-watertight detections, for instance in case the vehicle changes lanes when passing the point for monitoring, will be filtered out automatically, thus preventing problems of proof.

An activating signal is advantageously generated when a vehicle passes the point for monitoring in a predetermined direction. Action can thus be taken on the basis of the detection in respect of for instance establishing a violation, or in order to guide the traffic flow in the chosen direction past the point for monitoring. It is advantageous in this respect when an identification of the transmitting and receiving location is linked to the activating signal, so as to establish unambiguously where the vehicle passed. If the detection is used as part of law enforcement, for instance at a traffic light, at least one picture record of the passing vehicle is preferably made on the basis of the activating signal.

If the speed and the travel direction of the passing vehicle is also calculated from the received reflections of various laser beams, the detection can also be used to establish a violation of the maximum speed applying at the location. The speed may also be important when the detection is used to guide the traffic flow at the point for monitoring. In order to be able to take action on the basis of the speed measurement, the calculated speed is advantageously linked to the activating signal.

So as to ensure that each detection results in useful and comparable reflections, the distance between the transmitting and receiving location and the point for monitoring on the one hand and the characteristic of the at least one transmitted laser beam on the other are preferably matched such that each laser beam hits the passing vehicles at a characteristic height. For each vehicle reflections of e.g. the bonnet, the windscreen pillar, the dors and the boot may be received, so as to create a well analysable profile.

When the road comprises a number of lanes, on each of which a specific point is to be monitored, it is recommended that for each lane a laser beam is transmitted at a related angle from the transmitting and receiving location. A plurality of lanes can thus be monitored from a single transmitting and receiving location, which results in savings in the cost of equipment and simplification of placing.

The invention also relates to a system for performing the above described method. Such a system for detecting the passage by a vehicle of a determined point for monitoring on a road is provided according to the present invention with a device disposed at a remote location for transmitting at least one laser beam substantially continuously to the point for monitoring, receiving reflections from the at least one transmitted laser beam, and determining from the received reflections that a vehicle is passing the point for monitoring.

BRIEF DESCRIPTION OF THE DRAWINGS

The invention is now elucidated on the basis of an exemplary embodiment, wherein reference is made to the accompanying drawing, in which.

DETAILED DESCRIPTION OF THE INVENTION

Figure 1:
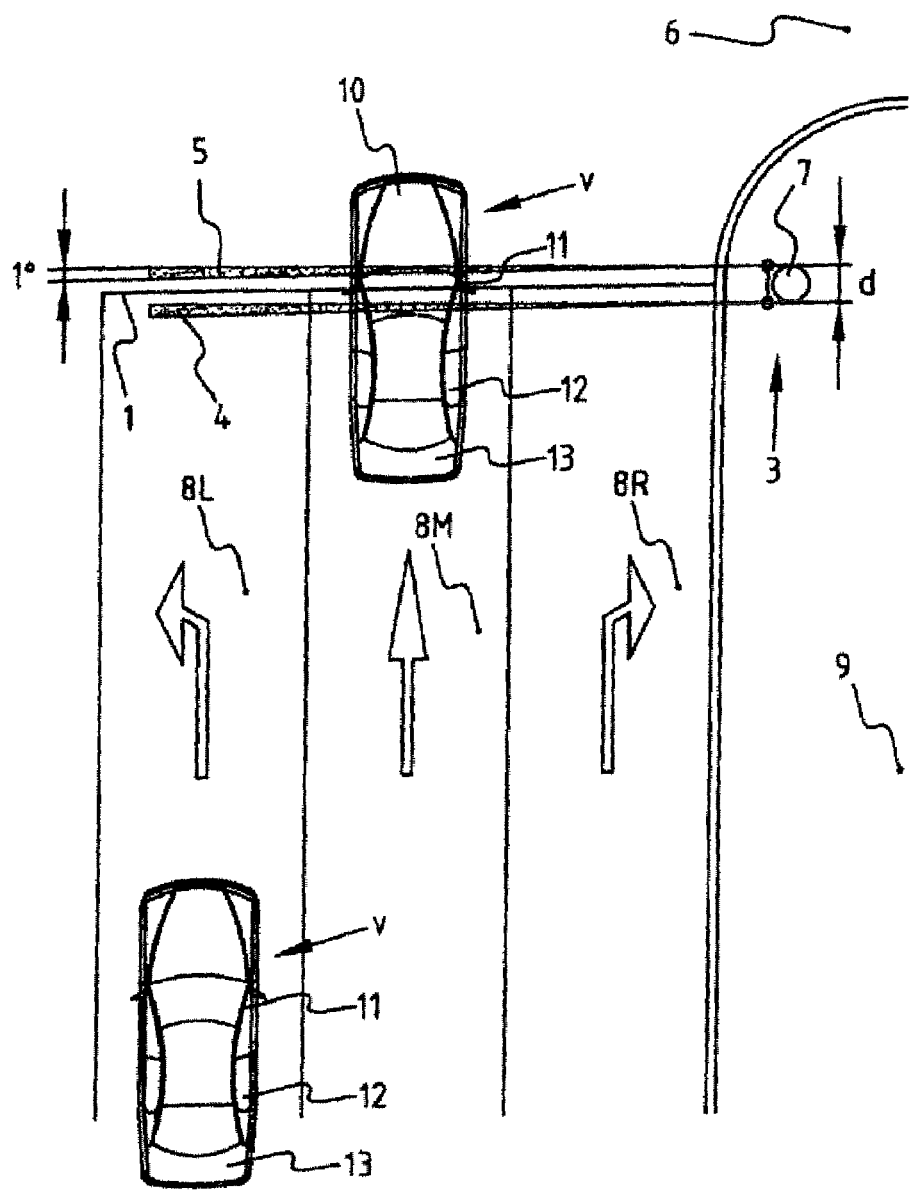
FIG. 1 is a schematic top view of a road with a point for monitoring thereon, in this case a stop line at a traffic light, and a detection system according to the invention.

The invention relates to a system for detecting passing of a determined point for monitoring 1 on a road 2, in this case a stop line at an intersection of the road and another road 6, which intersection is protected with traffic lights (not shown here) (FIG. 1). This detection system comprises a device 3 for transmitting a pair of parallel laser beams 4, 5 to the point for monitoring 1, and receiving reflections of the laser beams 4, 5 generated by passing vehicles V. The transmitting and receiving device 3, which is disposed at a location remote from stop line 1, here on the pavement 9 in line with the stop line 1, is further adapted to determine from the received reflections that a vehicle V is passing stop line 1.

Figure 2:
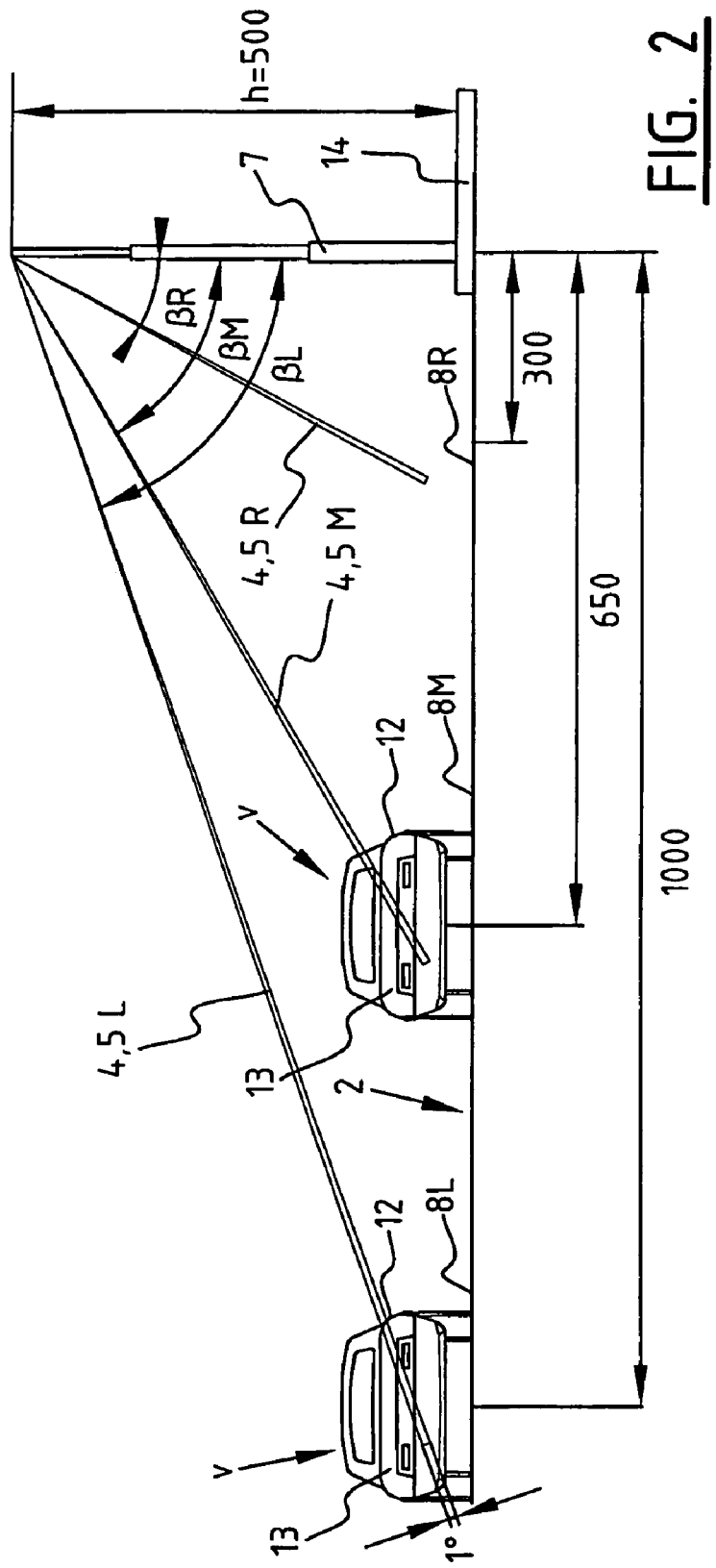
FIG. 2 is a rear view of a pair of laser beams transmitted by the detection system of FIG. 1.

In the shown embodiment the road 2 on which the stop line 1 is drawn has a lane 8L for traffic turning left, a middle lane 8M for traffic going straight on, and a lane 8R for traffic turning right. The transmitting and receiving device or laser device 3 is therefore adapted to transmit three pairs of laser beams 4L, 5L, 4M, 5M, 4R, 5R which have a differing orientation such that they are each directed at the stop line 1 in one of the lanes 8L, 8M, 8R (FIG. 2). To this end the laser device 3 is placed at an elevation, here on a pole 7, so that the laser beams 4M, 5M and 4L, 5L, respectively, that are transmitted towards the more remote lanes 8M and 8L, respectively, are not reflected by traffic in the lanes 8R and 8M, respectively, that are closer to the pavement.

As stated above, the transmitting and receiving device 3 is disposed adjacently of road 2, and the pairs of laser beams 4, 5 are each transmitted—as seen in the horizontal plane— substantially at right angles to the travel direction of the passing vehicles V. It is thus possible to dispense with placing of portals for laser device 3 above road 2, which often meets with practical objections. If however a portal were to be placed, a separate laser device 3 could be suspended above each lane 8L, 8M, 8R, the laser beams 4, 5 from which could then be transmitted straight down.

As stated above, the pairs of laser beams 4, 5 are transmitted at different angles $\beta_L$, $\beta_M$, $\beta_R$ to the travel direction, as seen in the vertical plane. The height h of pole 7, the angles $\beta_L$, $\beta_M$, and $\beta_R$ and the characteristics of the laser beams 4, 5 are matched such that each laser beam 4, 5 hits the passing vehicles at more or less the same height, where the vehicles have a characteristic shape. This is of importance with regard to profiling of the vehicles V.

Figure 3:
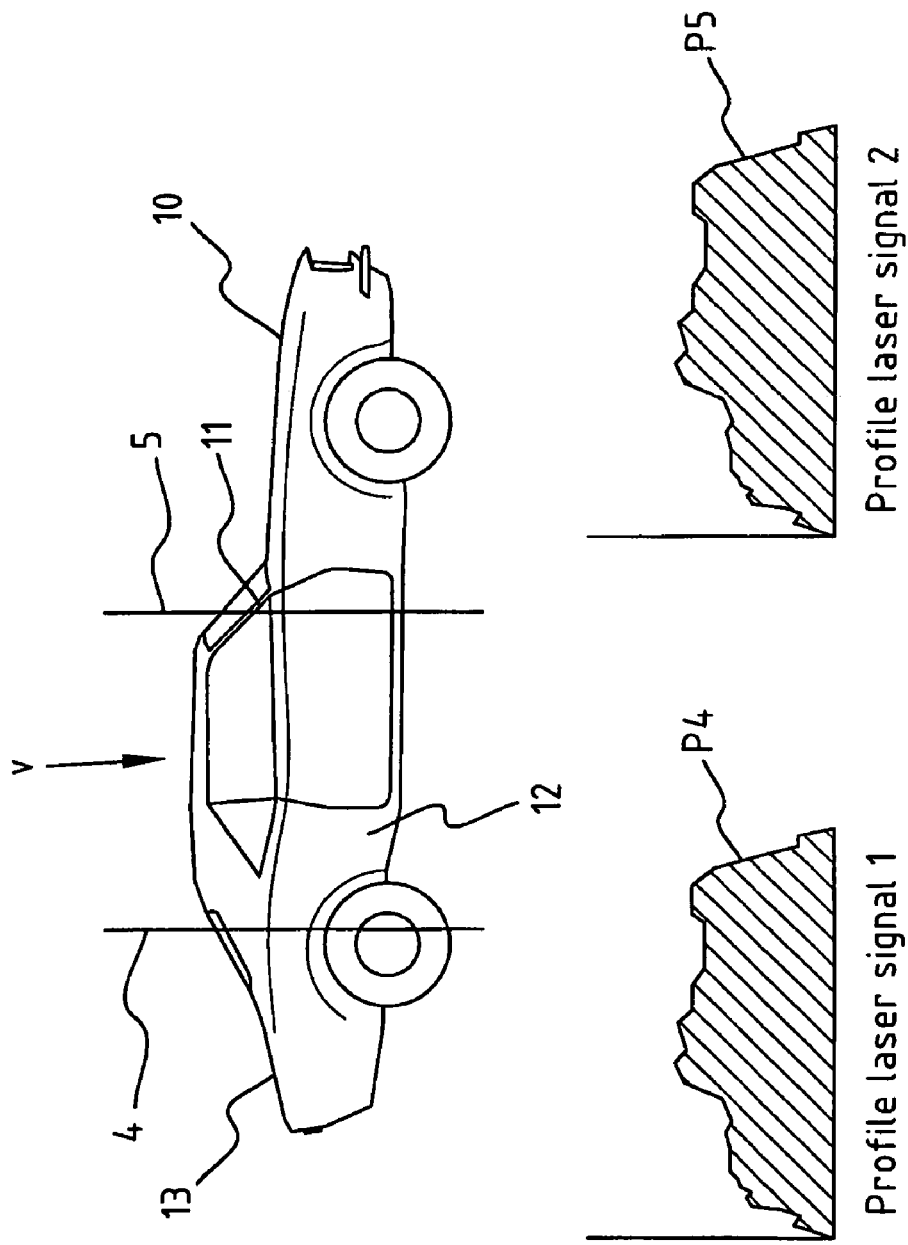
FIG. 3 shows schematically two profiles of reflections of various laser beams caused by a passing vehicle.

Laser device 3 is adapted to detect stop line 1 being passed in a predetermined direction by generating from the received reflections a profile P of the vehicle (FIG. 3).

This profile P consists of a series of successively received reflections that are characteristic for the passing parts of vehicle V. For instance, reflections of the relatively flat bonnet 10 are quite different from those of the windscreen pillar 11 or the side 12 of the vehicle, which in turn differ from the reflections of the boot 13 (in case the passing vehicle is a saloon). Laser device 3 compares the profiles $P_4$ and $P_5$ of the reflections received on the first and second laser beams 4 and 5, respectively, and tries to find corresponding points therein. Only when profiles $P_4$ and $P_5$ do indeed exhibit a sufficient degree of correspondence is the detection that a vehicle has passed accepted as valid.

When a vehicle V passes stop line 1, an activating signal is generated by laser device 3. This signal is used to activate an external system coupled to the detection system.

In the shown embodiment the external device will be a picture recording device, which makes one or more recordings as soon as a vehicle V passes stop line 1 while the traffic light is red. The detection system forms part of a red-light camera (RLC) system. On the basis of these picture records, in which in addition to vehicle V and red traffic light all manner of additional information can be displayed, vehicle V can be identified, so that the holder of the vehicle registration can be sent a fine.

However, it is also conceivable that the activating signal be fed to a counter of a traffic control system (not shown here) which calculates an optimum speed on the basis of the number of passing vehicles V per unit of time, and displays this speed on display boards 11 above or at the side of the road 2. This will be the case when the detection system is placed along a motorway.

In order to be able to establish unambiguously the point at which a vehicle V has passed, particularly in respect of furnishing proof when the detection is used in the context of law enforcement, the laser device 3 may link its identification to the activating signal to be sent.

To enable optimal use of the presence of a detection system at the point being monitored thereby, laser device 3 is further adapted in the shown embodiment to calculate the speed of the passing vehicle V from the received reflections. This calculation is based on the known distance d between the laser beams 4 and 5 on the one hand and a measured time differential between receipt of the reflection profiles $P_4$ and $P_5$ on the other. The detection system can thus be used not only as a RLC system, but also as a speed camera system.

The communication between laser device 3 and other systems, for instance the camera proceeds via standards developed for conventional red-light cameras with induction loops. The interface 5 and protocols used therein are described in detail in the applicant's co-pending patent application. "Method and system for detecting with radar the passage by a vehicle of a point for monitoring on a road", the relevant parts of which are incorporated herein by reference.

The system and the method as described above thus make it possible with simple means to establish when a vehicle passes a determined point on the road, such as a stop line, without operations on the road surface being necessary for this purpose. The method and the system are hereby highly suitable for application at busy traffic intersections. The detections are very reliable as a result of the checks applied thereto, and can also serve for law enforcement purposes.

Although the invention has been elucidated above on the basis of a number of exeplary embodiments, it will be apparent that it is not limited thereto. Within the scope of the following claims many variants and modifications can be envisaged which are deemed to fall within the scope of this application.

What is claimed is:

1. A method for detecting the passage of a vehicle past a determined point for monitoring a road, comprising transmitting at least two substantially parallel laser beams from a remotely situated location to the point for monitoring; receiving reflections from the at least two transmitted laser beams at the remotely situated location, and determining from the received reflections that the vehicle is passing the point for monitoring, wherein said laser beams are transmitted substantially continuously, further wherein said determining is by comparing the received reflections of the at least two laser beams, wherein a time profile of the vehicle is determined from a number of successively received reflections, and the validity of the detection of that vehicle passing the point for monitoring is determined if the time profiles from reflections of the various laser beams correspond precisely.

2. The method of claim 1, wherein the at least one laser beam is transmitted substantially at right angles to the travel direction of the passing vehicle.

3. The method of claim 1, wherein an activating signal is generated when a vehicle passes the point for monitoring in a predetermined direction.

4. The method of claim 3, wherein an identification of the transmitting and receiving location is linked to the activating signal.

5. The method of claim 3, wherein at least one picture record of the passing vehicle is made on the basis of the activating signal.

6. The method of claim 3, wherein the speed and the travel direction of the passing vehicle is calculated from the received reflections of die laser beam.

7. The method of claim 6, wherein the calculated speed is linked to the activating signal.

8. The method of claim 1, wherein the transmitting and receiving location and the point for monitoring are such that each laser beam hits passing vehicles at a characteristic height.

9. The method of claim 1, wherein the road comprises a number of lanes, on each of which a specific point is to be monitored, and for each lane a laser beam is transmitted at a related angle from the transmitting and receiving location.

10. A detection system for detecting the passage of a vehicle past a determined point for monitoring a road, comprising a transmitting and receiving device disposed at a remote location for: (1) transmitting at least one laser beam substantially continuously to the point for monitoring, (2) receiving reflections from the at least one transmitted laser beam, and (3) determining from the received reflections that a vehicle is passing the point for monitoring, wherein the transmitting and receiving device is adapted to transmit at least two substantially parallel laser beams and to determine the moment of passing of the point for monitoring by said vehicle by comparing the received reflections from the various laser beams, further wherein the transmitting and receiving device is adapted to determine a time profile of the vehicle from a number of successively received reflections of a laser beam, and to accept a detection that the vehicle is passing the point for monitoring as valid only if the profiles determined from reflections of the various laser beams correspond precisely.

11. The detection system of claim 10, wherein the transmitting and receiving device is adapted to transmit at least one laser beam substantially at right angles to the travel direction of die passing vehicle.

12. The detection system of claim 10, wherein the transmitting and receiving device is adapted to generate an activating signal when a vehicle passes the point for monitoring in a predetermined direction.

13. The detection system of claim 12, wherein the transmitting and receiving device is adapted to link its identification to the activating signal.

14. The detection system of claim 12, further comprising a device connected controllably to the transmitting and receiving device for making at least one picture record of the passing vehicle.

15. The detection system of claim 10, wherein the transmitting and receiving device is adapted to calculate from the received reflections of various laser beams the speed and the travel direction of the passing vehicle.

16. The detection system of claim 12, wherein the transmitting and receiving device is adapted to link the calculated speed to the activating signal.

17. The detection system of claim 10, wherein the transmitting and receiving device is disposed at a distance from the point for monitoring and adapted to transmit a laser beam such that each laser beam bits passing vehicles at a characteristic height.

18. The detection system of claim 10, wherein the road comprises a uiurnber of lanes, on each of which a specific point is to be monitored, and the transmitting and receiving device is adapted to transmit for each lane a laser beam at a related angle.

* * * * *